United States Patent [19]

Hwang

[11] Patent Number: 4,827,764
[45] Date of Patent: May 9, 1989

[54] NEEDLE-TYPE TIRE PRESSURE GAUGE

[76] Inventor: Tian-Ding Hwang, No. 35, Sec. 4, Ting Tsao Rd., Lu Kang, Chang Huah, Taiwan

[21] Appl. No.: 149,550

[22] Filed: Jan. 28, 1988

[51] Int. Cl.$^4$ .......................... B60C 23/02; G01L 7/16
[52] U.S. Cl. ..................................... 73/146.8; 73/744; 116/34 R
[58] Field of Search ............................. 73/146.8, 744; 116/34 R

[56] References Cited

U.S. PATENT DOCUMENTS 1,666,787  4/1928  Michelin ............................... 73/715

FOREIGN PATENT DOCUMENTS 0506915  6/1920  France ................................. 73/744

Primary Examiner—Donald O. Woodiel
Attorney, Agent, or Firm—Browdy & Neimark

[57] ABSTRACT

A needle-type tire pressure gauge includes a drum body having a closed end and an open end defining therebetween a receiving room, a tire pressure taking means communicating with the receiving room and having a head having an annular indentation and an air intake communicating with the indentation, a tire pressure actuated means pivotally mounted in the receiving room, having a toothed surface and connected to the tire pressure taking means, a resilient means connected between the receiving room and the tire pressure actuated means for the restoration of the tire pressure actuated means, a gear rotatably mounted in the receiving room and meshing with the toothed surface, and a gear stopping means for temporarily stopping the rotation of the gear for a convenient reading of the position of a needle which is connected to the gear and pivotally mounted on a cover which has a scale thereon and engages the open end so that when the tire pressure a actuated means is actuated by an air coming from the tire pressure taking means to pivot in the receiving room, the gear will carry therewith the needle to pivot above the scale.

4 Claims, 5 Drawing Sheets

NEEDLE-TYPE TIRE PRESSURE GAUGE

FIELD OF THE INVENTION

The present invention relates to a tire pressure gauge, and more particularly to a needle-type tire pressure gauge.

BACKGROUND OF THE INVENTION

The most advanced needle-type or drum-type tire pressure gauge, as shown in FIG. 1, presently known includes a head 1 for urging against the air valve of a tire, a tire pressure actuated piston 2, a rod member 3 tanslatable in a durm body 4 and having a toothed surface 5, a gear 6 meshing with surface 5 and connected thereto a needle pivotable above a scale representing the tire pressure, and a spiral spring 7 located between the ends 21, 31 of piston 2 and member 3 for transmitting the air pressure to member 3. Such gauge has the disadvantages that spring 7 is not always compressed axially and rod member 3 also is always not translated axially in its longitudinal direction. Both will adversely influence the measurement of the tire pressure. It is therefore attempted by the inventor to obviate the shortcomings encountered in the prior art.

SUMMARY OF THE INVENTION

It is therefore an object of the present invention to provide a needle-type tire pressure gauge capable of accurately measuring the tire pressure.

According to an aspect of the present invention, a needle-type tire pressure gauge includes a drum body having a closed end and an open end defining therebetween a receiving room, a tire pressure taking means communicating with the receiving room and having a head having an annular indentation and an air intake communicating with the indentation, a tire pressure actuated means pivotally mounted in the receiving room, having a toothed surface and connected to the tire pressure taking means, a resilient means connected between the receiving room and the tire pressure actuated means for the restoration of the tire pressure actuated means, a gear rotatably mounted in the receiving room and meshing with the toothed surface, a cover having a scale thereon and engaging the open end, and a needle pivotally mounted on the cover and connected to the gear so that when the tire pressure actuated means is actuated by an air coming from the tire pressure taking means to pivot in the receiving room, the gear will carry therewith the needle to pivot above the scale.

Preferably, the present gauge further includes a gear stopping means mounted in the receiving room for temporarily stopping the rotation of the gear for a convenient reading of the position of the needle when pivoted.

Conveniently, the tire pressure taking means can include a tubular member integrally formed to the drum body.

Certainly the tire pressure actuated means can include a piston piece having a first end received in the tubular member and a second end pivotally mounted in the receiving room, and an intermediate piece having a third end pivotally mounted in the receiving room to be coaxial with the second end and a fourth end provided with the toothed surface. The resilient means can include a first resilient member connected between the receiving room and the piston piece for the restoration of the piston piece and a second resilient member wound around the third end and connected between the receiving room and the intermediate piece for the restoration of the intermediate piece.

Certainly the piston piece and the intermediate piece can be integrally formed together.

Certainly the first and second resilient members can be a spiral and a wire-like springs respectively.

Certainly the gear can have a shaft having a flat part and the gear stopping means can include a resilient wire member having a first end fixed in the receiving room and a second end, and engagable with the flat part, and a push piece radially mounted on the drum body, attached thereto the second end of the rod member and radially movable with respect to the drum body within a limited range so that when it is in a released position, the wire member will engage with the flat part to prevent the gear from rotation and when in a pushed position, the wire member is compressed to disengage itself from the flat part.

The present invention will now be described with reference to the accompanying drawings, in which:

DETAILED DESCRIPTION OF THE PREFERRED EMBODIMENT

Figure 1:
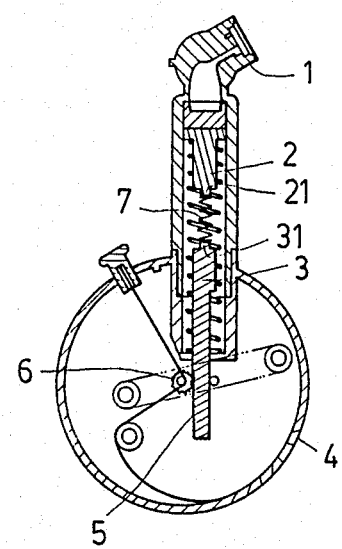
FIG. 1 is a sectional view showing a known needle-type tire pressure gauge.
Figure 2:
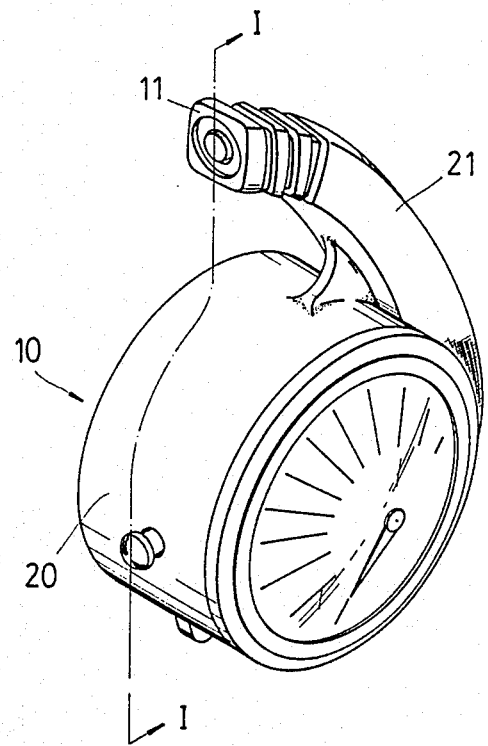
FIG. 2 is a perspective view showing a needle-type tire pressure gauge according to the present invention.
Figure 3:
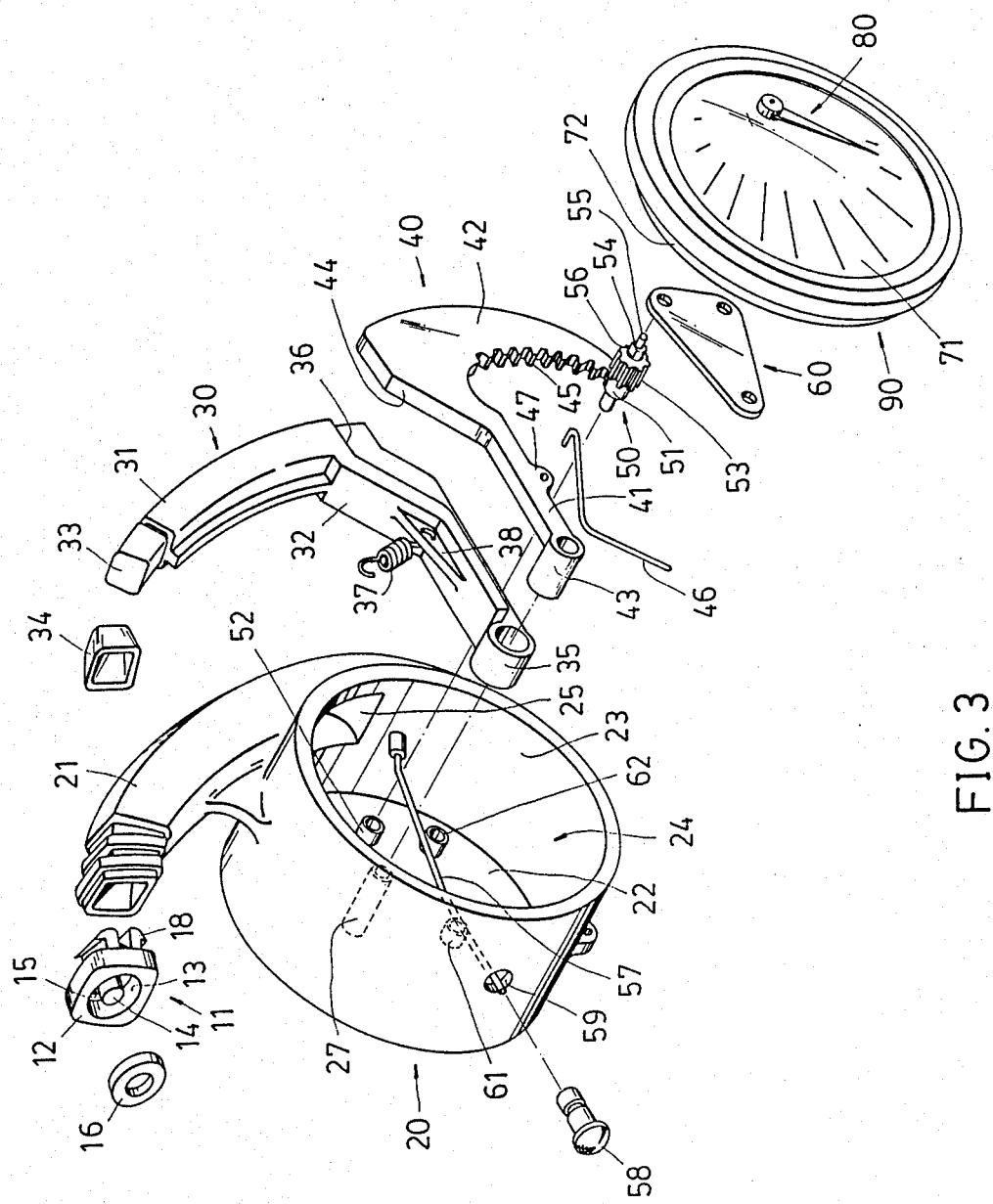
FIG. 3 is an exploded view showing respective parts of a needle-type tire gauge according to the present invention.
Figure 4:
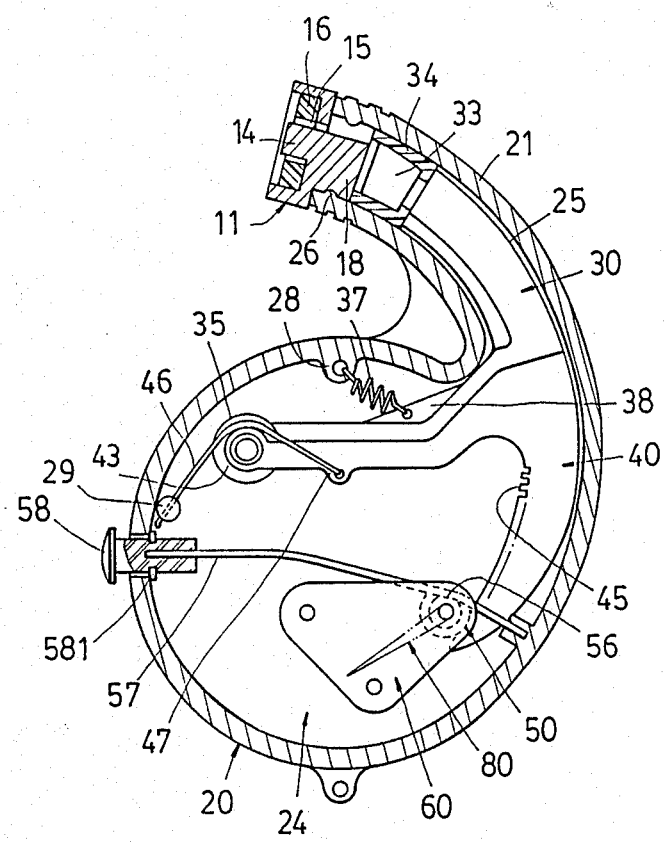
FIG. 4 is a sectional view taken along line I—I in FIG. 2 and showing a needle of a tire pressure gauge according to the present invention in its first position.
Figure 5:
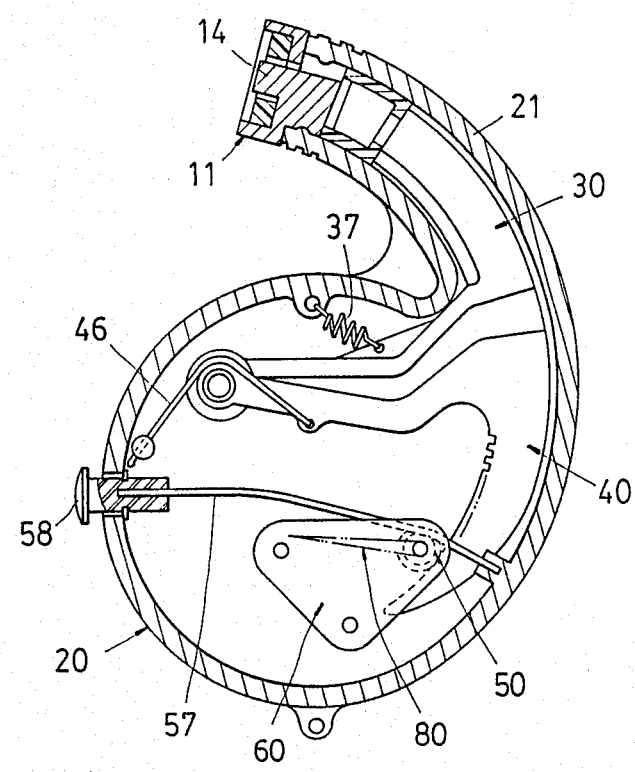
FIG. 5 is a sectional view taken along line I—I in FIG. 2 and showing a needle of a tire pressure gauge according to the present invention in its second position.

Referring now to FIGS. 2–5, a needle-type tire pressure gauge 10 according to the present invention includes a drum body 20 having a closed end 22 and an open end 23 defining therebetween a receiving room 24, a tire pressure taking means (11, 21) communicating with receiving room 24 and having a head 11 having an annular indentation 13 and an air intake 15 communicating with indentation 13, a tire pressure actuated means (30, 40) pivotally mounted in receiving room 24, having a toothed suface 45 and connected to tire pressure taking means 21, a resilient means (37, 46) connected between receiving room 24 and tire pressure actuated means (30, 40) for the restoration of means (30, 40), a gear 50 rotatably mounted in receiving room 24 and having teeth 53 meshing with toothed surface 45, a cover 90 having a scale 71 thereon and a rim 72 engaging with open end 23, and a needle 80 pivotally mounted on cover 90 and connected to gear 50 so that when tire pressure actuated means (30, 40) is actuated by an air coming from tire pressure taking means (11, 21) to pivot in receiving room 24, gear 50 will carry therewith needle 80 to pivot above scale 71.

Tire pressure taking means (11, 21) can further include a tubular member 21 integrally formed to drum body 20, having a tubular hollow 25 and having at the inside surface adjacent the free end thereof an annular protuberance 26. Measuring head 11 has a top surface 12 and a contral protrusion 14 inserting therebetween a washer 16 and has a hooked bottom 18 for hooking on annular protuberance 26. Gear 50 has a gear shaft having a first end 51 rotatably mounted in a hollow protrusion 52 on closed end 22 and having a second end having different diametrical segments 54, 55 with the larger diametrical segment 54 thereof cut to be a flat part 56 and the smaller diametrical segment 55 connected to needle 80.

Preferably the present gauge 10 further includes a gear stopping means (57, 58) for temporarily the rotation of gear 50 for a convenient reading of the position of needle 80 when pivoted. Gear stopping means (57, 58) includes a resilient wire member (spring) 57 engagable with flat part 56 and having a first end fixed in receiving room 24 and a second end extending in a hole 59 on drum body 20, and a push piece 58 radially mounted drum body 20, attached thereto the second end of wire member 57 and retaining thereon a washer 581 inside drum body 20 to be radially movable with respect to drum body 20 within a limited range so that when it is in a released position, wire member 57 will engage with flat part 56 to prevent gear 50 from rotation and when in a pushed position, wire member 57 is compressed to disengage itself from flat part 56.

Tire pressure actuated means (30, 40) can include a piston piece 30 and an intermediate piece 40. Piston piece 30 has a first arm 31 received in tubular hollow 25 and having a first end 33 mounting thereon bushing 34 having an outer bore slightly larger than the bore of tubular hollow 25 in order to obtain a press-fit therebetween, and a second arm 32 having a second end 35 pivotally mounted around a protrusion 27 on closed end 22. Intermediate piece 40 has a first arm 41 having a third end 43 pivotally mounted around protursion 27 to be coaxial with second end 35 and having a top surface 44 matching against a shoulder surface 36 on second arm 32 of piston piece 30, and a secnd arm 42 provided with toothed surface 45.

Resilient means (37, 46) includes a first resilient member 37, e.g. a spiral spring, connected between a hook ring 28 in receiving room 24 and a rib 38 on second arm 32 for the restoration of piston piece 30, and a second resilient member 46, e.g. a wire-like spring, connected between a retaining protrusion 29 on closed end 22 and a hook ring 47 on first arm 41 and wound around third end 43 for the restoration of intermediate piece 40.

When the above respective parts of the present gauge 10 have been suitably assembled, a securing plate 60 cooperating with protrusions 61, 62 on closed end 22 secures thereon smaller diameterical segment 55, before cover 90 is covered on drum body 20.

Certainly, piston piece 30 and intermediate piece 40 can alternatively be integrally formed together with suitable modifications made to respective parts.

Operating procedures of the present gauge 10 are as follows:

When head 11 is inserted thereon the air valve of a tyre to have central protrusion 14 open the air valve, air pressure acts against resilient members 37, 46 and pivots piston piece 30 and intermediate piece 40 about protrusion 27 which results in that toothed surface 45 rotates gear 50 and thus needle 80 a predetermined angle and one can now read the tyre pressure shown by needle 80 on scale 71. When gauge 10 is removed from the tire valve, piston piece 30 will restore to its original position since the air pressure disappears while intermediate piece 40 is temporarily retained in its pivoted position since it is meshed by gear 50 which is stopped by wire member 57 which will permit one to have an enough time to read the tyre pressure after which push piece 58 is pushed radially inwardly with respect to drum body 22 to disengage wire member 57 from flat part 56 which will permit resilient member 46 to restore intermediate piece 40 and thus needle 80.

What is claimed is:

1. A needle-type tyre pressure gauge comprising:
   a drum body having a closed end and an open end defining therebetween a receiving room;
   a tire pressure taking means communicating with said receiving room and having a head having an annular indentation and an air intake communicating with the indentation; a tire pressure actuated means pivotally mounted in said receiving room, having a toothed surface, and connected to said tire pressure taking means; a resilient means connected between said receiving room and said tire pressure actuated means for the restoration of said tire pressure actuated means;
   a gear rotatably mounted in said receiving room and meshing with said toothed surface;
   a cover having a scale thereon and engaging said open end; and a needle pivotally mounted on said cover and connected to said gear so that, when said tire pressure actuated means is actuated by an air coming from said tire pressure taking means to pivot in said receiving room, said gear will carry therewith said needle to pivot above said scale;
   further comprising a gear stopping means mounted in said receiving room for temporarily stopping the rotation of said gear for a convenient reading of the position of said needle when pivoted;
   wherein said tire pressure taking means includes a tubular member integrally formed to said drum body;
   wherein said tire pressure actuated means includes:
   a piston piece having a first end received in said tubular member and a second end pivotally mounted in said receiving room; and
   an intermediate piece having a third end pivotally mounted in said receiving room to be coaxial with said second end and a fourth end provided with said toothed surface; and
   said resilient means includes:
   a first resilient member connected between said receiving room and said piston piece for the restoration of said piston piece; and
   a second resilient member wound around said third end and connected between said receiving room and said intermediate piece for the restoration of said intermediate piece.

2. A needle-type tyre pressure gauge as claimed in claim 1 wherein said piston piece and said intermediate piece are integrally formed.

3. a needle-type tyre pressure gauge as claimed in claim 1 wherein said first and second resilient members are a sprial and a wire-like springs respectively.

4. A needle-type tyre pressure gauge as claimed in claim 1 wherein said gear has a shaft having a flat part and said gear stopping means includes:
   a resilient wire member having a first end fixed in said receiving room and a second end, and engageable with said flat part; and a push piece radially mounted on said drum body, attached thereto said second end of said wire member, and radially movable with respect to said drum body within a limited range so that when it is in a released position, said wire member will engage with said flat part to prevent said gear from rotation and when in a pushed position, said wire member is compressed to disengage itself from said flat part.

* * * * *